United States Patent [19]

Smillie, III

[11] Patent Number: 4,941,797
[45] Date of Patent: * Jul. 17, 1990

[54] POWER-OPERATED LIFT AND PRESENTING MECHANISM

[75] Inventor: Charles M. Smillie, III, West Bloomfield, Mich.

[73] Assignee: C.M. Smillie & Company, Ferndale, Mich.

[*] Notice: The portion of the term of this patent subsequent to Feb. 16, 2005 has been disclaimed.

[21] Appl. No.: 138,916

[22] Filed: Dec. 28, 1987

Related U.S. Application Data

[63] Continuation-in-part of Ser. No. 17,922, Feb. 24, 1987, Pat. No. 4,725,183.

[51] Int. Cl.$^5$ .............................................. B65G 67/00
[52] U.S. Cl. ..................................... 414/462; 187/18; 224/42.44; 254/122; 254/126; 254/98; 414/347; 414/522
[58] Field of Search .............. 414/495, 522, 540, 541, 414/589, 678, 345, 501, 497, 545, 462; 224/42.07, 42.08, 42.43, 42.44, 42.21, 273, 310, 311, 314, 321; 187/18, 8.71; 254/7 R, 7 C, 9 R, 9 C, 98, 122, 126

[56] References Cited

U.S. PATENT DOCUMENTS

| | | |
|---|---|---|
| 2,091,069 | 8/1937 | Girl . |
| 2,094,401 | 9/1937 | Girl . |
| 2,454,566 | 11/1948 | Pfeiffer .................... 414/522 |
| 2,890,908 | 6/1959 | McLean et al. ............. 414/540 X |
| 2,953,292 | 2/1958 | Werner ..................... 224/42.44 |
| 3,329,292 | 7/1967 | Haddock .................. 414/522 X |
| 3,623,707 | 11/1971 | Klopp ....................... 254/122 |
| 3,726,422 | 4/1973 | Zelin . |
| 3,982,718 | 9/1976 | Folkenroth et al. ............ 187/18 X |
| 3,991,857 | 11/1976 | Wolk et al. .................. 187/18 |
| 4,221,528 | 9/1980 | Gordos . |
| 4,251,178 | 2/1981 | Bourgraf et al. . |
| 4,405,116 | 9/1983 | Eisenberg ................... 187/18 X |
| 4,604,022 | 8/1986 | Bourgraf .................... 414/462 X |
| 4,685,860 | 8/1987 | McFarland ................. 414/462 X |
| 4,725,183 | 2/1988 | Smillie, III ................. 414/462 X |
| 4,749,169 | 6/1988 | Pickles ...................... 254/122 |
| 4,799,849 | 1/1989 | Miller ........................ 414/462 |

Primary Examiner—Robert J. Spar
Assistant Examiner—Robert S. Katz
Attorney, Agent, or Firm—Dykema Gossett

[57] ABSTRACT

A power-operated lift and presenting mechanism has a base structure that is placed on the floor of an automobile. A carriage moves between an elevated position and a lowered, transport position when a lift assembly causes the carriage and base structure to be separated and brought closer together. The lift assembly is selectively power operated by a reversible electrical motor to expand to separate the carriage from the base structure and to contract to bring them closer together. The carriage has a track and track follower and a platform mounted on the track follower so that the platform is movable to and fro along the track. The platform is capable of supporting heavy and bulky articles. The platform is movable along the track when the carriage is in an elevated position, between a retracted position in which the platform is generally over the base structure and within the trunk, and a presenting position in which the platform extends out from over the trunk generally out of the trunk. A covering is provided for protecting the lift assembly while not impeding its capability of expanding and contracting vertically.

13 Claims, 6 Drawing Sheets

POWER-OPERATED LIFT AND PRESENTING MECHANISM

RELATED APPLICATIONS

This is a continuation-in-part of copending U.S. application Ser. No. 017,922 filed on February 24, 1987, now U.S. Pat. No. 4,725,183 issued Feb. 16, 1988.

BACKGROUND OF THE INVENTION

I. Field of the Invention

The present invention relates generally to lift mechanisms for automobile trunks and, more particularly, to power-operated lift and presenting mechanisms for use in assisting persons loading and unloading heavy and bulky articles to and from trunks of automobiles. Still more particularly, the invention relates to power-operated lift and presenting mechanisms, preferably of the portable type that can be put into an automobile trunk to translate a heavy and bulky article over the rear wall of an automobile trunk from a cart or the like, lower the article down into the trunk so that the lid may closed, subsequently lift the article up out of the trunk when the lid is opened, and translate the article back over the rear wall to be loaded onto a cart or the like. Yet more particularly, the present invention relates to a power-operated lift and presenting mechanism, for use in assisting a person to load and unload a heavy and bulky article to and from the trunk of an automobile, the lift and presenting mechanism having improved features to make loading and unloading easier, installation and removal quicker, and use and operation safer.

II. Problems Solved by the Invention

As if designed by Aladdin's genie, the luggage compartments or trunks of many modern automobiles defy the outside compact proportions of the vehicles. But it is by no means owing to the magical paradox of the genie's lamp that automotive designers have managed to provide roomy trunks for relatively small-sized vehicles. For the most part, design achievement is simply the result of lowering the undercarriage in the vicinity of the trunk, raising the rear deck, and positioning the trunk lid to open essentially over the trunk. In effect, the trunk well is deepened.

The structured spaces of modern automobile trunk designs provide ample volumes into which heavy and bulky articles may be arranged. But, without the help of Aladdin's genie to load and unload the bulky articles, the advantageous volumes cannot be fully enjoyed. Specifically, the inconvenience of manipulating a bulky article, especially with the weight that usually accompanies bulk, is often beyond the abilities of a person given to the task of loading and unloading the heavy and bulky article, particularly a driver of small stature who is without the assistance of other passengers. A person would have to lift the article over the rear trunk wall and then gently down into the trunk to avoid damaging the article or the automobile. Thus, the driver or any other person loading a heavy or bulky article into the trunk of an automobile risks damage to the automobile and the article as well as physical strain or other injury to herself or himself. Anyone who has experienced back pain firsthand never forgets it. It influences the quality of one's life immeasurably. It makes the simplest errands, such as running to the store for groceries, more complicated and difficult.

Because the trunk of a typical sedan is designed for people with strong and healthy backs, who must bend forward at the waist to lift articles out of the storage area and who, because of such bending, themselves become vulnerable to back strain and injury, many people with or without back problems who drive sedans don't use their trunks for much more than a place to store their spare.

III. Description of the Prior Art

Notwithstanding a need to provide for the special problems associated with loading and unloading heavy and bulky articles into modern deep well automobile trunks, efforts have been made to overcome the more general problems of loading and unloading automobile trunks. For example, U.S. Pat. No. 3,726,422, issued to Zelin, discloses a luggage rack that may be inserted into the rear of a station wagon body. Although the rack may be securely mounted above the floor or folded seats of the station wagon, it can be easily released to be taken out of the wagon. The rack includes a carriage which slides on a rack support through the rear door of the station wagon. By this means, the carriage can be brought to an extended position for placing and arranging luggage on and unloading luggage from the carriage. The carriage then can be slid back as the rack is brought to a retracted position within the station wagon.

The device has the obvious limitation of being structured for use in station wagons. This limitation precludes its use in the trunk of a vehicle where articles are to be let down into the trunk, rather than slid horizontally across the vehicle floor. Accordingly, the Zelin device operates at a disadvantage when compared to the present invention, considering the particular use for which the present invention is intended.

U.S. Pat. No. 2,091,069 and U.S. Pat. No. 2,094,401, both issued to C. Girl, disclose loading and unloading devices for the rear storage compartments of automobiles that are not station wagons, but the devices are nevertheless analogous in the Zelin device. All of the devices are essentially carriers that ride rail channels fixedly mounted to the platforms of vehicle luggage compartments. By manipulation readily available to a person desiring to load or unload an article strapped to the carrier of either of the Girl devices, the carrier is brought rearwardly from a position under the seat of the vehicle to the area under the trunk lid where it can be more easily loaded or unloaded by a person from either side of the vehicle.

Analogous to the shortcoming of the Zelin device, the relative greater ease and convenience of loading and unloading afforded by either Girl device, over the difficulty of reaching forwardly through the trunk to area under the seat, falls short of providing a means of easily loading down into the well of a car trunk. Loading a cart or the like still would require having to bend over to lift a weight up from the floor of the trunk or the platform on the floor of the trunk, having to raise weight to the elevation at which it will sit on the cart or the like, and having to transport the weight to the cart. Aside from this important shortcoming, Girl also teaches that the devices must be fixedly mounted on the vehicle which adversely affects the portability of the devices.

U.S. Pat. No. 4,221,528, issued to Gordos, discloses a lifting device made up of a plurality of channel segments attached to the interior surfaces of the trunk lid of a passenger car, a bar that may be slid into the channel segments to project telescopically therefrom, and a block and tackle mechanism, together with a canvas or net sling, attached to the telescoped end of the bar. The block and tackle mechanism, together with the canvas or net sling, may be used to withdraw a heavy object located below the bar. The device further utilizes arm braces provided at the lateral edges of the trunk to transfer the load imposed on the trunk lid by the bar and channel arrangement to the body of the automobile as a triangulating arrangement.

This device calls for extensive modification of the interior of the trunk lid, but as a more significant disadvantage, the device depends on means beyond the invention disclosed by Gordos to lift or lower the heavy object from or to the floor of the trunk.

U.S. Pat. No. 2,890,908, issued to McLean et al., discloses a luggage compartment construction for vehicle bodies wherein a luggage compartment platform is a part of the unitary structure of a deck lid assembly that may be vertically elevated to a position permitting sidewise access to the platform underneath the trunk lid. The elevated platform provides greater ease of loading and unloading than at its unelevated position, which is closer to a standard elevation for a luggage compartment platform as the floor of the luggage compartment.

The McLean et al. elevating mechanism for the deck lid assembly is made up of a pair of laterally spaced apart scissors structures, each scissors structure with two legs pivotal with respect to one another about a pivot axis at the crossing of the two legs, and a jack screw assembly which actuates the pivoting. The pivot axis extends along a rod connecting the two structures; each leg is secured at one of its two ends to the underside of the platform and, at the other, to the vehicle structure. As the legs of each scissors approach becoming parallel in a vertical direction, the platform is elevated and, as they approach becoming parallel in a horizontal direction, the platform is lowered. The screw jack assembly includes a remotely operable reversible electrical motor. The structure is operated by remotely switching on the motor, preferably from the vehicle instrument panel, to rotate the screw of the jack in a direction that draws the legs of the structures toward becoming vertically parallel, thus elevating the platform, or to rotate the screw jack in a direction that draws the legs of the structures toward becoming horizontally parallel, thus lowering the platform.

Notwithstanding the elevated platform of the McLean et al. apparatus, there is still, in accordance with the teaching of McLean et al., the requirement that a person unloading or loading the platform bend over the side fenders of the vehicle to reach the article. Furthermore, McLean et al. does not teach or suggest means of translating the weight from the platform to a cart or the like. It is also the case that McLean et al. teaches that the apparatus, as well as the motor, are to be bolted or otherwise fixedly connected to the vehicle.

By far, the most advantageous apparatuses heretofore invented as a means of unloading heavy articles, from the standpoint of portability and presentment to a position for transference to a cart or the like, are disclosed in U.S. Pat. No. 4,251,178 (the '178 apparatus) and U.S. Pat. No. 4,604,022 (the '022 apparatus), both issued to Bourgraf. The Bourgraf apparatus are particularly adapted to unloading business machines and the like and are to be used in conjunction with a business machine cart for transporting and demonstrating the business machines.

The apparatus of the '178 patent, in particular, is a cart that has a wheel section and a handle section. The handle section is formed of a spaced apart pair of track along which a carriage for mounting a business machine is adapted to travel down to the foot of the cart. The foot of the cart is constructed like the platform of a dolly. A trunk loading attachment is provided that is comprised of a track-forming frame extension adapted to be connected to the upper end of the handle section, a base plate that is adapted to be positioned in the trunk, and an adjustable pivot support which mounts the base plate and to which the track-forming frame extension is pivotably mounted so that the carriage can be pushed up from the trunk, as it travels on the track of the frame extension, to the handle of the cart and down to the foot of the cart for unloading.

The '022 apparatus is a lifting mechanism to be placed in the trunk of a vehicle. There is a lift platform that is movable from a storage position within the trunk to an elevated position in which the lift platform projects outwardly from the trunk. The platform is raised by a lever mechanism that may be powered, according to this limited teaching, by a gas spring. The lift mechanism may be used with or without a cart.

While both of the Bourgraf apparatuses have portability as an object, only the lift mechanism of the '022 patent does not require it to be fixedly mounted in the trunk. The lift mechanism of the '022 patent also has the advantage of a power assist for lifting an article from the trunk. With regard to this latter advantage, however, the power assist disclosed in the '022 patent is not as easily controllable as the electric motor of the present invention and calls for an energizing means other than as provided in the standard power package of most automobiles.

IV. Objects of the Invention

Accordingly, it is the primary object of the present invention to provide a lift and presenting mechanism that can carry a heavy and bulky article over the rear wall of an automobile trunk from a cart or the like, lower the article down into the trunk so that the lid can be closed, subsequently lift the article up out of the trunk when the lid is open, and translate the article back over the rear wall to be presented for loading onto a cart or the like.

It is the further object of this invention to provide a lift and presenting mechanism that is power-operated at least to perform the lifting and lowering operations involved in loading and unloading heavy or bulky articles into and out of an automobile trunk.

Still further, it is an object of the invention to provide a power-operated lift and presenting mechanism for automobile trunks that is attachable to the trunk so that it is an integral part of the automobile, yet light weight and readily detachable so that it can be lifted up and taken from the trunk to provide additional trunk space when necessary and so that it can be lifted up, put back into the trunk, and made ready to perform the task of lifting and lowering a heavy and bulky article and translating the article over the rear wall of the trunk.

Yet another object of the present invention is to provide a power lift and presenting mechanism that can be disengaged in a matter of seconds to allow quick and easy access to a spare tire or unobstructed trunk space.

Yet still another object of the present invention is to provide a power operated lift and presenting mechanism that has convenience and safety features to allow the lift to be lowered when there is an electrical failure and prevent the mechanism from being activated accidentally.

SUMMARY OF THE INVENTION

In accordance with the present invention, a power operated lift and presenting mechanism has a base structure adapted to be seated on the floor of a trunk of an automobile. A carriage is disposed above the base structure when the base structure is so seated. The carriage has track follower means that are engaged by track means so that the track follower means are capable of moving to and fro along the track means between a retracted position and a presenting position. In the retracted position, the track follower means are congruent with the track means, while in the presenting position the track follower means are generally out from the base structure.

Also included in the power-operated lift and presenting mechanism is a platform that is connected to the track follower means. Accordingly, the platform is movable with the track follower means between the retracted position and the presenting position. The platform is structurally capable of supporting heavy and bulky article.

Lifting means in the power operated lift and presenting mechanism are provided for actuating the carriage and platform attached thereto upwardly from a transport position, in which the carriage is proximate the base structure, to an elevated position in which the carriage and platform are remote from the base structure. The lifting means also brings the carriage downwardly from the elevated position to the transport position. In both cases the platform is in a retracted position when the carriage is moved, as a safety measure.

The lifting means includes an assembly of upper links and lower links that are pivotally connected to one another, to the carriage, and to the base structure. According to the structure of the connections, the upper links are rotatable toward and away from the lower links. Rotation of the upper links away from the lower links brings the carriage close to the base structure and puts the platform in a transport position. Conversely, rotation of the upper link from the lower link separates the carriage from the base structure and puts the platform in an elevated position. A power-inducing assembly including a reversible electrical motor and a screw jack is used to actuate the rotation of the upper link and lower links relative to one another.

The power operated lift and presenting mechanism has a covering to protect the lift assembly while not interfering with its movement between transport and elevated positions. It also has means to adapt it to adjustable connection with a trunk wall while allowing it to be easily disassembled from the trunk wall and taken from the trunk to provide additional trunk space when needed.

Advantages and meritorious features of the power operated lift and presenting mechanism will be fully understood with the following description of the preferred embodiment, the appended claims, and the drawings. A brief description of the drawings follows.

BRIEF DESCRIPTION OF THE DRAWINGS

FIG. 1 is a phantom view of the rear portion of an automobile body with the invention contained in the trunk of the automobile, showing how a driver would make use of the invention to unload a heavy and bulky article to a cart or the like.

DETAILED DESCRIPTION OF THE PREFERRED EMBODIMENT

Figure 1:
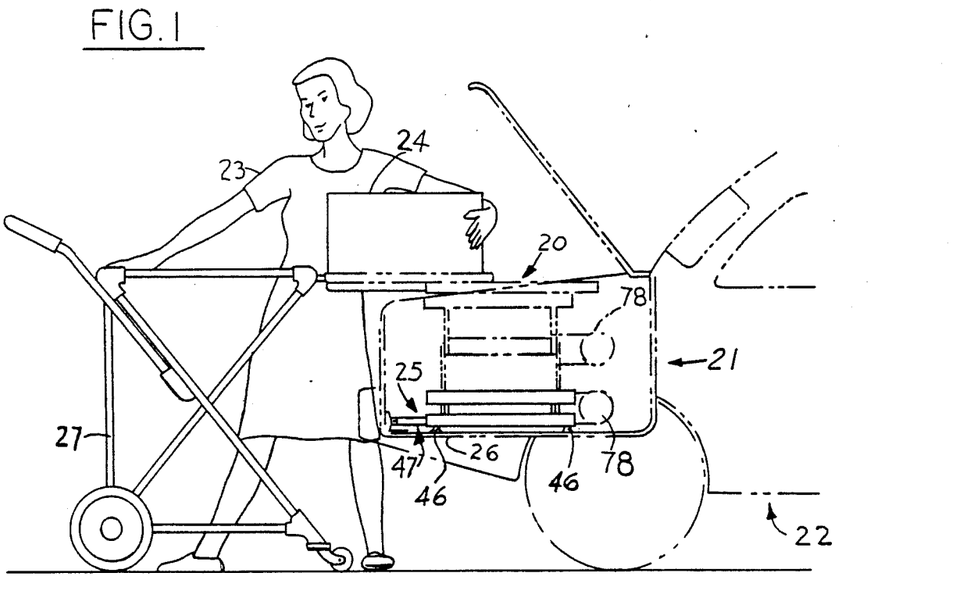

Turning first to FIG. 1, a power operated lift and presenting mechanism 20 in accordance with the present invention is shown in a trunk 21 of an automobile 22, as power operated lift and presenting mechanism 20 is used to assist a person 23 to load or unload a heavy and bulky article 24. Perhaps, though not necessarily, power operated lift and presenting mechanism 20 is used to assist the driver of the automobile 22 where the driver is the only person 23 available to load or unload the heavy and bulky article 24. In any such assisting use, power operated lift and presenting mechanism 20 is oriented with its base structure 25 seated on the floor 26 of trunk 21, so that the heavy and bulky article 24 may be unloaded from power operated lift and presenting mechanism 20 onto a cart 27, or the like, or loaded onto power operated lift and presenting mechanism from cart 27.

Figure 2:
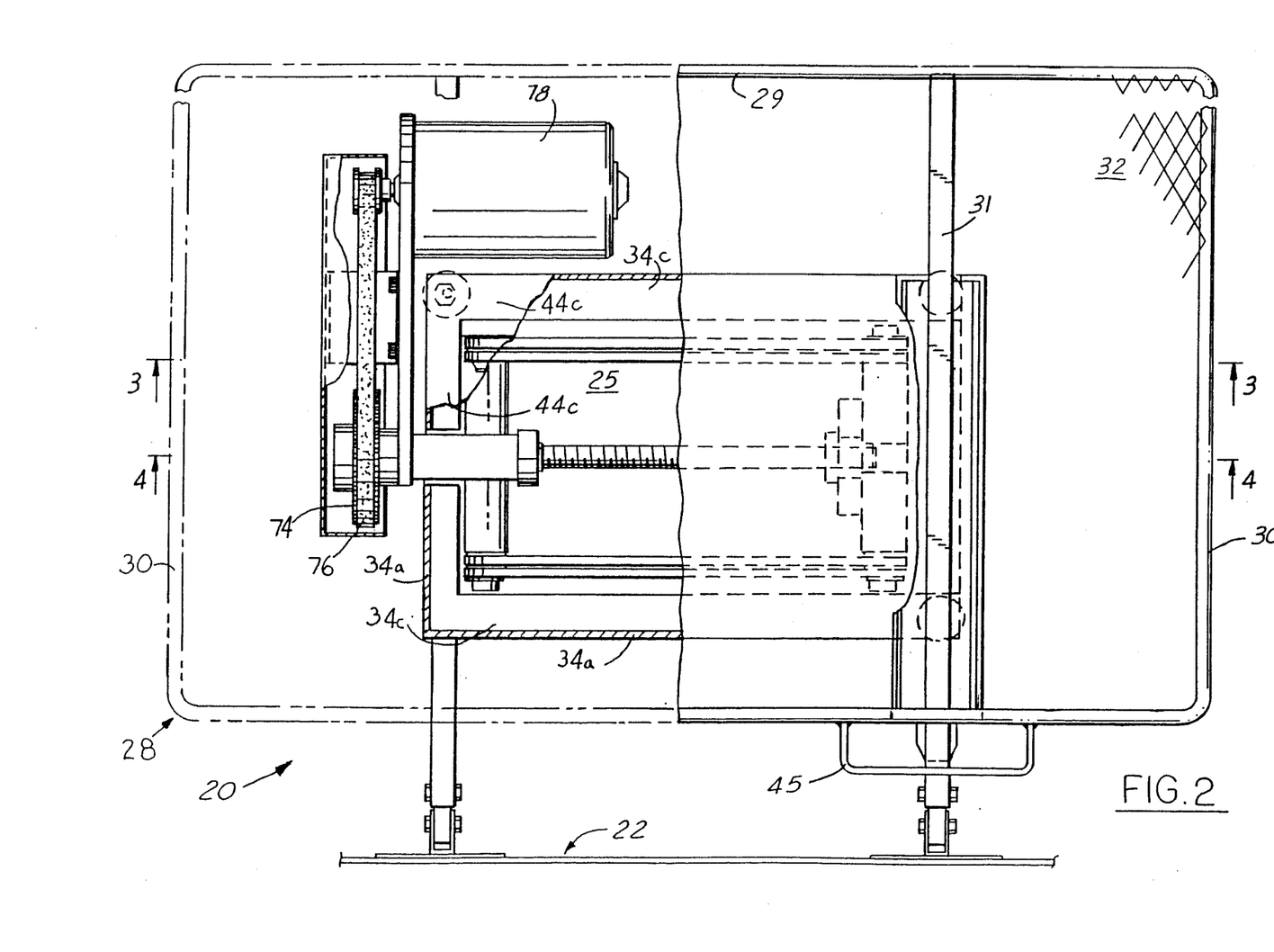
FIG. 2 is a partial top plan view of a power operated lift and presenting mechanism incorporating the present invention, as viewed with the base of the power operated trunk and presenting mechanism seated on the floor of an automobile trunk and the base structure connected to a wall of the automobile trunk, the platform partially cutaway to reveal the motor and part of the base structure.
Figure 3:
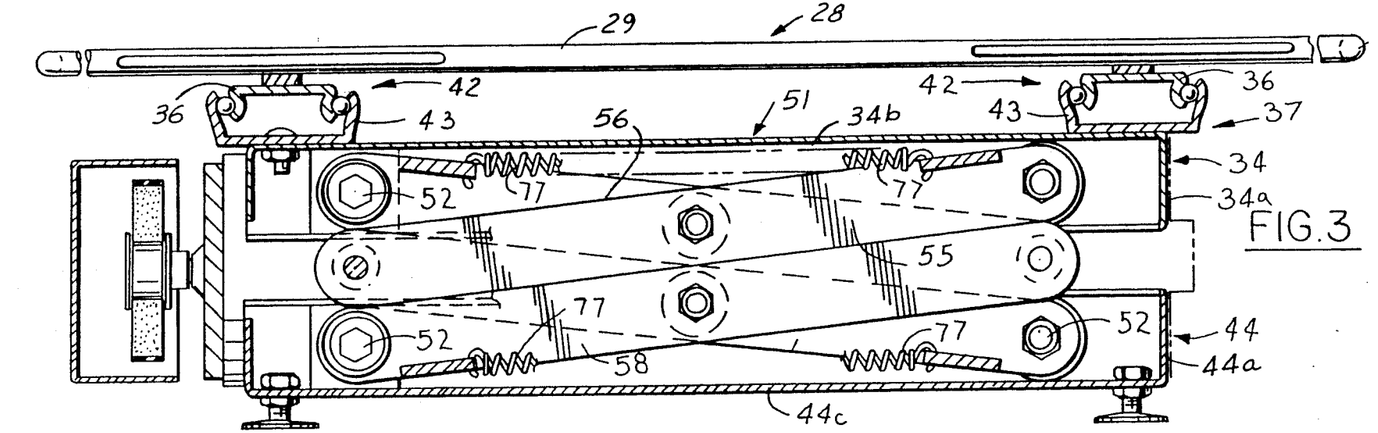
FIG. 3 is a sectional view taken along lines 3—3 of FIG. 2 showing a side of the platform on which carrying handles are situated.
Figure 4:
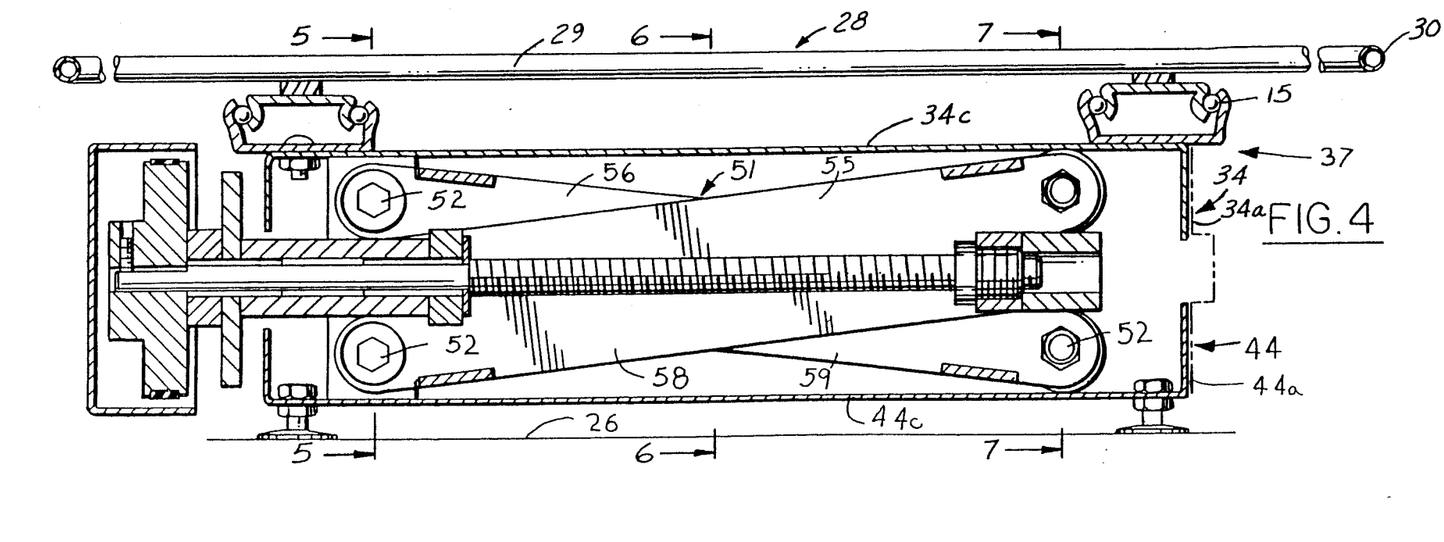
FIG. 4 is a sectional view of the invention taken on the line 4—4 of FIG. 2, with specific detail being given to the screw shaft.
Figure 5:
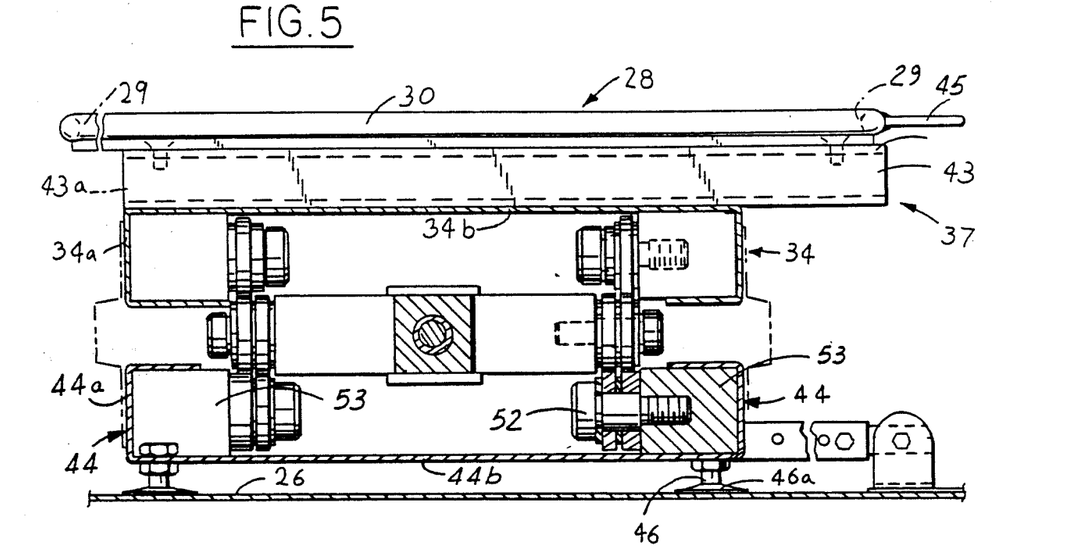
FIG. 5 is a sectional view taken substantially on the line 5—5 of FIG. 4.
Figure 6:
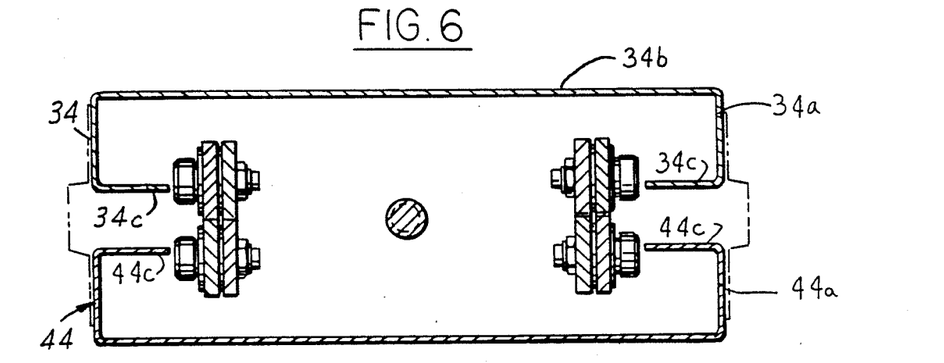
FIG. 6 is a sectional view taken substantially on the line 6—6 of FIG. 4.
Figure 7:
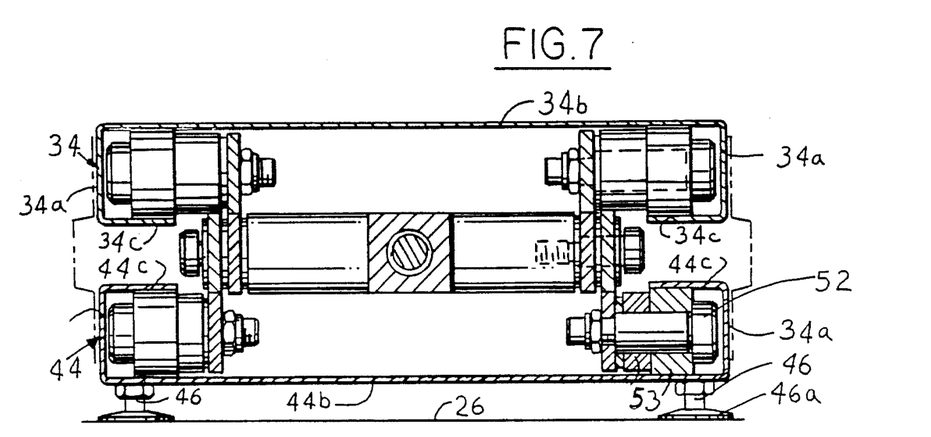
FIG. 7 is a sectional view taken substantially on the line 7—7 of FIG. 4.

Turning now to FIGS. 2, 3 and 4, a platform or tray 28, which is adapted to seat heavy and bulky article 24 of FIG. 1, is shown. Platform 28 is seen as having a generally rectangular outer perimeter with rounded corners. Two generally parallel longitudinal frame members 29 and two generally parallel outer transverse frame members 30 rigidly and integrally frame platform 28. As an alternative to the rounded corner framing, outer transverse frame members 30 may be joined perpendicularly to longitudinal frame members 29 at the extremities of the frame members to form miter bends with welded joints. In either case, the outer perimeter is framed by parts of a rigid unitary structure.

Inner transverse frame members 31 are joined perpendicularly to longitudinal frame members 29, with the extremities of inner transverse frame members 31 welded to intermediate locations of longitudinal frame members 29 to form welded T-joints, thus complementing the rigid unitary structure. Inner transverse frame members 31 and the portions of longitudinal frame members 29 disposed between inner transverse frame members 31 accordingly fashion a generally inner rectangular perimeter. In addition, there are two wing perimeters, each formed with two parallel sides consisting of an outer transverse frame member 30 and an inner transverse frame member 31 that are proximate to one another and two parallel sides consisting of the portions of longitudinal frame members 29 spanning between the proximate pair of outer transverse frame member 30 and inner transverse frame member 31. This structural configuration is best seen in FIGS. 2 and 10.

Longitudinal frame members 29, outer frame members 30, and inner frame members 31 preferably are all light weight steel structural tubing having sufficient strength for supporting the heavy and bulky articles 24 mentioned in connection with FIG. 1. As an example of tubing meeting these specifications, 21 gauge steel round tubing is suggested.

Figure 10:
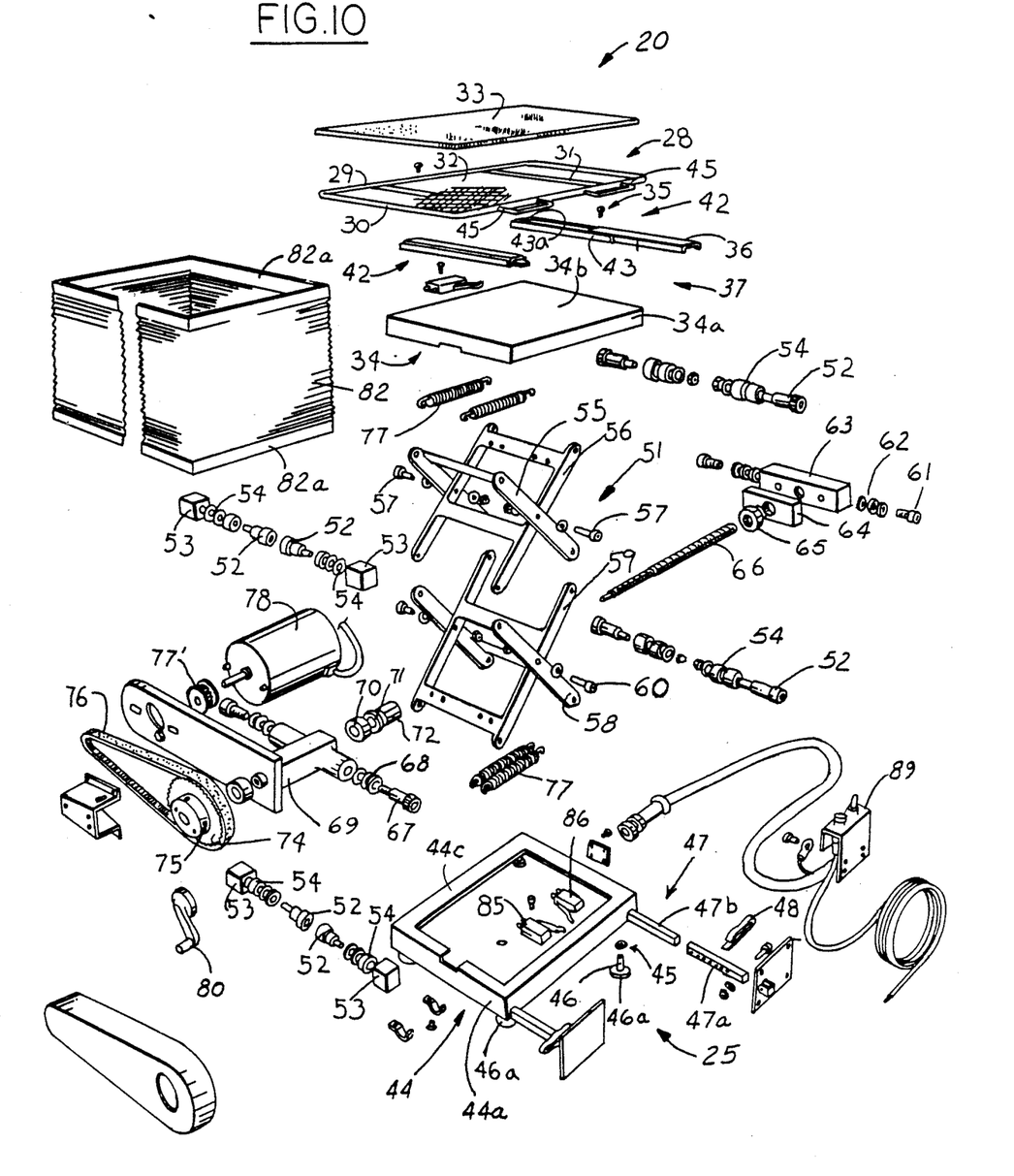
FIG. 10 is an exploded, parts drawing of the power-operated lift and presenting mechanism incorporating the present invention.

Turning for a moment to FIG. 10, in which the platform 28 is shown in its disposition relative to other parts of the lift and presenting mechanism 20 above and below the platform 28, a covering or carpet 33 is positioned on the platform 28 to soften the seating of the heavy and bulky article 24 shown in FIG. 1. Beneath the carpeting a platform floor 32 is constructed of an expanded metal construction selected for its strength and light weight properties. Floor 32 is connected to the underside of longitudinal frame members 29, outer transverse frame members 30, and inner transverse frame members 31 by known means of uniting these parts according to their material construction, as for example welding or brazing.

Referring now in particular to FIGS. 3 and 4, a carriage 37 is shown in a disposition to support platform 28. Carriage 37 includes a rigid upper guide assembly 34, which, along with a covering for a lifting assembly to be described later, protects internal working machinery of the power-operated lift and presenting mechanism 20. Upper guide assembly 34 is a box-like structure with shallow sides 34a. The shallow sides 34a are oriented to depend downwardly from a rectangular top plate 34b. A flange 34c returns from the sides 34a to the underside of the top plate 34b. Top plate 34b is attached to platform 28 via drawer slide 42 to now be described.

Each of two drawer slide assemblies 42 includes a track follower means, which, as a structural component, is a sliding channel 36 as shown in FIGS. 3-5 and 10. Each drawer slide assembly 42 also has a track means as a guide channel 43 rigidly connected to the upper guide assembly 34. The connection is by conventional means, as for example, bolt, washer, and nut assemblies 35, where each assembly is composed of a buttonhead machine screw, a shake proof washer, and a jam bolt. Both guide channels 43 extend parallel to parallel sides of the upper guide assembly 34.

Each sliding channel 36 rides on ball bearings 15 within guide channel 43 in what is now being defined as a forward direction along guide channel 43, from a position in which sliding channel 36 is generally congruent with guide channel 43 to a position in which sliding channel 36 extends substantially out from guide channel 43. It is to be appreciated that guide channel 43 has an end stop 43a to prevent sliding channel 36 from sliding in a rearward direction. In the preferred embodiment, platform 28 is connected to both sliding channels 36 by means of flat head machine screws 38, so that platform 28 is supported by sliding channels 36 and is accordingly movable between the two positions described for sliding channel 36. The first position, the "retracted position", corresponds to sliding channels 36 being generally congruent with guide channels 43. The second position, the "presenting position", corresponds to sliding channels 36 extending substantially out from guide channels 43 in the forward direction. Attached to the platform so that it leads the platform in the forward direction is at least one handle 45, but preferably two handles 45 are attached. The attachment is by the same uniting means for attaching the floor 32 to the structural parts of the platform 28. Thusly positioned, the handle or handles 45 define the front of the lift and presenting mechanism 20.

The base structure 25 of the lift and presenting mechanism 20 has a lower guide assembly 44, which, like upper guide assembly 34, is box-like with shallow sides 44a and a flange return 44c. The lower guide assembly, however, is oriented so that it has a bottom plate 44b rather than a top plate 34b as in the analogous structure upper guide assembly 34.

In each corner of lower guide assembly 44, a jam nut 45 is anchored for receiving a height adjustable elevator screw 46. Each elevator screw 46 has a foot pad 46a for seating the lift and presenting mechanism 20 on the floor 26 of the trunk 21 as in FIG. 1. With the foot pads 46a situated on the floor 26 of the trunk 21, each elevator screw may be adjusted to level the lift and presenting mechanism 20 so that the platform 28 is level.

Leveling the lift and presenting mechanism 20 stabilizes it in one respect so that it will not tilt or quaver during transport or operation. The lift and presenting mechanism 20 is stabilized in yet another respect. Extending forwardly of the lift and presenting mechanism 20 are two stabilizing arms or adjusting arms 47. Each adjusting arm 47 has a telescoping section 47a that adjust outwardly from a fixed section 47b which is fixedly attached to lower guide assembly 44. A hitch pin 48 sets the lift of telescoping section 47a relative to the fixed section 47b. At the rearward end of each adjusting arm 47, attached thereto by a hex head screw, lockwasher, and jam nut assembly 47, is a bracket that is attachable to the automobile, preferably the wall of the trunk 21 at the rear of the automobile in the example of the automobile 22 of FIG. 1, by four head screws.

Figure 8:
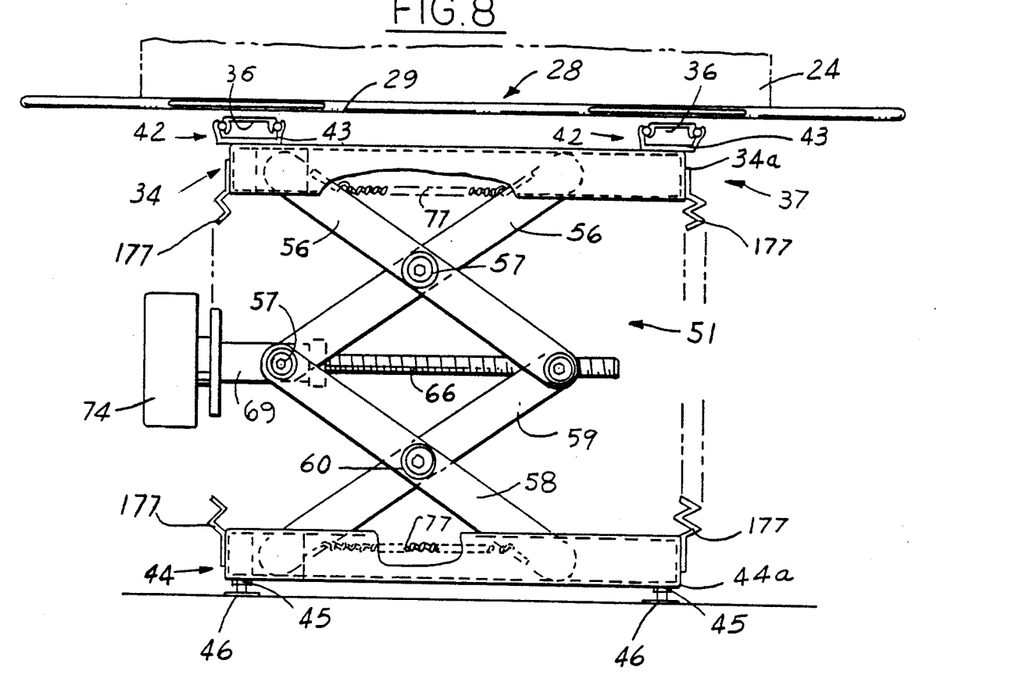
FIG. 8 is a partial elevational view of the power operated lift and presenting mechanism taken on the side on which the carrying handles are situated and showing the platform in an elevated position.

An important feature of the invention is the lift assembly or scissors jack 51, shown with particularity in FIGS. 2, 3 and 8, as well as in FIG. 10. The lift assembly 51 is power-operated to lift actuating carriage 37 upwardly from a position, designated as a transport position, in which upper guide assembly 34 is in relative vertical proximity to lower guide assembly 44, to a position, designated as an elevated position, in which upper guide assembly 34 is vertically separated from lower guide assembly 44. Lift assembly 51 is mounted on socket head shoulder screws 52 for rotatable attachment to lower guide assembly 44. Accordingly, each socket head shoulder screw 52 extends into a mounting block 53 against thrust bearings 54 seated therein. Each mounting block 53 is seated in the lower guide assembly 44 to slide along a side 44a between the bottom plate 44b and the return flange 44c. The lift assembly 51 is rotatably mounted to the upper guide assembly 34 by a similar arrangement.

A more detailed explanation of how lift assembly 51 is pivotally attached to upper and lower guide assemblies 34 and 44 involves an explication of how upper outside and inside links 55 and 56 are connected to lower outside and inside links 58 and 59 and how these links are connected to upper and lower guide assemblies 34 and 44. As can be seen in FIG. 10, upper outside link 55 midway straddles upper inside link 56 in a cross-wise disposition. In this disposition, upper outside link 55 is pivotally connected to upper inside link 56 by socket head shoulder bolt 57. In the same fashion lower outside link 58 straddles lower inside link 59 and is pivotally connected thereto by socket head shoulder bolt 60.

Consistent with the orientation shown in FIG. 10, the lower most ends of upper outside link 55 are connected to ends of lower inside link 59 by an assembly of socket head shoulder screws 61, thrust bearings 62, and link bracket 63. This assembly, consisting of screw 61, bearing 62, and bracket 63, spans between the connected ends of upper outside link 55 and lower inside link 59. A flange 64 and shake proof washer 65 are bolted to link bracket 63, so as to provide support for one end of a screw shaft 66. Ends of upper inside link 56 are similarly connected to the ends of lower outside link 58, here, by an assembly consisting of socket head shoulder screws 67, thrust bearings 68, and motor bracket 69, which assembly spans between the connected ends of upper inside link 56 and lower inside link 58. Analogous to the assembly that includes link bracket 63, an assembly consisting of motor bracket 69 with a thrust bearing 70, a washer 71, and a vibration dampener 72 provides support for the other end of a screw shaft 66. At this other end, the screw shaft is received through motor bracket 69 and thrust bearing 73 so as to be received by drive gear 74 to which it is rigidly fixed by set and lock screws 75.

Finally, the remaining ends of upper outside and inside links 55 and 56 and the links of lower outside and inside links 58 and 59 are pivotally connected to upper and lower guide assemblies 34 and 44 in the manner as has already been described with reference to the complete lift assembly 51.

In accordance with an optional feature of the power-operated lift and presenting mechanism, biasing means bias ends of upper outside and inside links 55 and 56 together, whereby the block 53, to which links 55 and 56 are pivotally attached, are biased together. Again in like fashion, ends of lower outside and inside links 58 and 59 are biased together, whereby the blocks 53 to which links 58 and 59 are pivotally attached, are biased together. In the preferred embodiment the biasing means are springs 77 which are attached to cross braces of upper outside and inside links 55 and 56 and to cross braces of lower outside and inside links 58 and 59. By this structure the opposing ends of each pair of links are pulled together.

Still in accordance with the feature, as shown particularly in FIG. 8, the biasing means may include springs 177 spanning between upper and lower guide assemblies 34 and 44 to bias upper and lower guide assemblies 34 and 44 together. In this embodiment, springs 177 may be welded, brazed or bolted together, or joined by any other known means to upper and lower guide assemblies 34 and 44. This feature, in combination with springs 77, stabilizes the structure of the lift assembly 51, whether in the transport or elevated postures.

Connected to drive gear 74 by means of a drive belt 76 is a pinion gear 77'. The pinion gear is mounted on the drive shaft of a motor 78, which is itself mounted on motor bracket 69 so as to be moved therewith. Actuation of lift assembly 51 is brought about by the pivoting motion of screw shaft 66, in one instance when the motor 78, to which screw shaft is operatively connected, is actuated and, in another, when motor 78 is inoperative and screw shaft 66 is manually pivoted by use of a manual crank handle 80 (shown in FIG. 10). Screw shaft 66 has thread extending substantially along its length. The threads are engaged by thread-driven nut 65 into which screw shaft 66 has been received. When screw shaft 66 pivots, thread-driven nut 65 is displaced along the extension of screw shaft 66. Screw shaft 66 also extends through a flange 64 and link bracket 63, but is free to rotate without affecting the displacement of flange 64 and link bracket 63 except as they are connected to nut 65.

When, in the instance of motor 78 actuating screw shaft 66 to pivot in a first rotational direction, let us arbitrarily take a counterclockwise direction, the disclosed structure of power operated and lift and presenting mechanism results in the displacement of nut 65 away from the motor bracket 69. This spreads the ends of the upper and lower inner and outer links 55, 56, 58 and 59 against the bias of springs 77. Accordingly, rotation of screw shaft 66 in the clockwise direction causes the lift assembly 51 to expand horizontally and contract vertically so as to bring the upper guide assembly 34 into close proximity to the lower guide assembly 44. Rotation of screw shaft 66 in a counterclockwise direction causes the lift assembly to expand vertically so as to separate vertically the upper guide assembly 34 and the rest of the carriage 37, including, the platform 28 from the lower guide assembly 44 and the rest of the base structure 25. When the base structure 25 is seated on the floor of an automobile trunk, as for example floor 26 in trunk 29 of automobile 22 illustrated in FIG. 1, an increase in the distance between the platform 28 and the base structure 25 elevates platform 28; conversely a decrease in the distance between the platform 28 and base structure 25 lowers the platform 28.

Still referring in particular to FIG. 10, a bellowed covering 82 is provided for the lift assembly 51. The covering is fittedly connected to the upper and lower guide assemblies 34 and 44 by collars 82a which flex to accommodate the rectangular structure of the upper and lower guide assemblies 34 and 44 but return to a shape that fits snugly around the perimeter of the upper and lower guide assemblies 34 and 44. The bellows 82 are preferably made of durable plastic characterized by its cleanability and flexibility.

Figure 9:
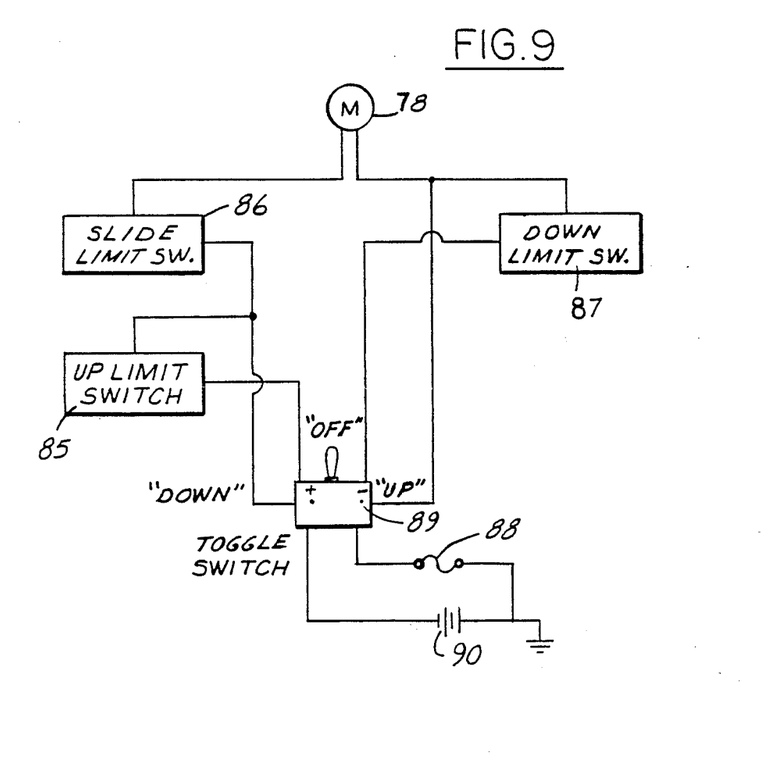
FIG. 9 is an electrical schematic of the power means of the invention.

In accordance with another feature of the invention as shown in FIGS. 9 and 10, the power operated lift and presenting mechanism has a toggle switch assembly 84 and limit switches 85, 86 and 87. Referring to FIG. 9, a battery 90 for providing direct current to electric motor 78, is shown in a circuit arrangement that has limit switches 85, 86, 87, a fuse 88, and a toggle switch 89. When toggle switch 89 is flipped to "up" position, schematically indicated in FIG. 10 as being to the right of the "off" position in which toggle switch 89 is shown, an up limit switch 85 and slide limit switch 86 are closed and a circuit is completed for powering the drive shaft of motor 78 in the direction that actuates screw shaft 66 to drive platform 28 upwardly in the manner that has been described earlier. Slide limit switch 86 is closed when platform 28 is in the retracted position, and up limit switch 85 is closed when the distance between platform 28 and base 25 has not reached a predetermined maximum. When toggle switch 89 is flipped to "down" position, as schematically indicated to the left of the "off" position in FIG. 10, and down limit switch 87 and slide limit switch 85 are closed, a circuit is completed for powering the drive shaft of motor 78 in the direction that actuates screw shaft 66 to drive platform 28 downwardly in the manner that has been described earlier. Down limit switch 87 is closed when upper and lower guide assemblies 34 and 44 are not at a predetermined proximity as an extent of the carriage's 37 downward travel. When any of the limit switches 85, 86, 87 are open or the toggle switch 89 is in an "off" position, which is a position between "up" and "down" positions, the circuits are open and motor 78 is not in operation.

Toggle switch 89 may be located at any of a number of convenient locations, depending on features of the automobile, for example automobile 22 of FIG. 1. In furtherance of the example, an automobile having an automatic trunk lid opener might have the toggle switch 89 located near a control for opening the trunk lid. In an automobile which requires one to walk to the rear of the automobile to open the trunk, toggle switch 89 may be in the trunk or on the power-operated lift and presenting mechanism 20.

As should now be apparent the present invention provides a power operated lift and presenting mechanism that can be used for loading and unloading heavy and bulky articles from an automobile trunk. The power operated lift and presenting mechanism may be placed in the trunk and secured therein as a part of the every day equipment package of the automobile. With little effort it may be taken from the trunk to provide additional room in the trunk for articles not presenting problems with loading and unloading the articles. As compared with prior art structures, the power operated lift and presenting mechanism is relatively simple and easy to use. The power operated lift and presenting mechanism has the advantage that it is adapted to be used with substantially any conventional cart or from which a heavy or bulky article may be transferred.

What is claimed is:

1. A power operated lift and presenting mechanism for conveniently loading and unloading articles to and from the trunk of an automobile in which the trunk has a floor, the power operated lift and presenting mechanism comprising:

a base structure adapted to be seated on said floor of the trunk;

a carriage movable from a transport position to an elevated position and from the elevated position to the transport position, said carriage having track means disposed generally in a plane parallel to said floor of the trunk, when said base structure is seated on said floor of the trunk, and track following means engaged by said track means so as to be movable to and fro, along said track means, between a retracted position and a presenting position;

a platform connected to said track follower means so as to be movable with said track follower means between the retracted position, in which said platform is disposed generally over said base structure when said base structure is seated on the floor of the trunk, and the presenting position, in which said platform is disposed generally out from over said base structure when said base structure is seated on the floor of the trunk;

power operated lifting means for actuating said carriage upwardly from the transport position to the elevated position and downwardly from the elevated position to the transport position, said platform being in a retracted position when said carriage is so moved;

whereby, when said base structure is seated on said floor of the trunk and said carriage is in the elevated position, said platform may be moved to a presenting position in which said platform projects out from the trunk so that articles may be loaded and unloaded at elevation and disposition that is convenient for loading and unloading the articles;

said lifting means includes a lift assembly disposed between said carriage and said base structure; and means enclosing said lift assembly, said enclosing means includes bellows respectively connected to said carriage and said base structures and spanning therebetween.

2. The power operated lift and presenting mechanism described in claim 1 wherein said lift assembly being rotatably connected respectively to said carriage and said base structure.

3. The power operated lift and presenting mechanism described in claim 2, wherein said carriage includes an upper guide assembly mounting said track means and wherein said base structure includes a lower guide assembly.

4. The power operated lift and presenting mechanism described in claim 2 further comprising means connecting said base structure to a wall of said trunk.

5. The power operated lift and presenting mechanism of claim 4 wherein said means connecting said base structure to a wall of said trunk includes at least one adjustable arm form positioning said base structure relative to said wall of trunk to which said base structure is connected.

6. A power operated lift and presenting mechanism for conveniently loading and unloading articles to and from the trunk of an automobile in which the trunk has a floor, the power operated lift and presenting mechanism comprising:

a base structure adapted to be seated on said floor of the trunk;

a carriage movable from a transport position to an elevated position and from the elevated position to the transport position, said carriage having track means disposed generally in a plane parallel to said floor of the trunk, when said base structure is seated on said floor of the trunk, and track following means engaged by said track means so as to be movable to and fro, along said track means, between a retracted position and a presenting position;

a platform connected to said track follower means so as to be movable with said track follower means between the retracted position, in which said platform is disposed generally over said base structure when said base structure is seated on said floor of the trunk, and the presenting position, in which said platform is disposed generally out from over said base structure when said base structure is seated on the floor of the trunk;

power operated lifting means for actuating said carriage upwardly from the transport position to the elevated position and downwardly from the elevated position to the transport position, said platform being in a retracted position when said carriage is so moved;

whereby, when said base structure is seated on said floor of the trunk and said carriage is in the elevated position, said platform may be moved to a presenting position in which said platform projects out from the trunk so that articles may be loaded and unloaded at elevation and disposition that is convenient for loading and unloading the articles;

said lifting means includes a lift assembly disposed between said carriage and said base structure, said lift assembly being rotatably connected respectively to said carriage and said base structure;

said lift assembly comprises an assembly of upper links, including an upper outside link and an upper inside link, said upper inside link rotatably connected to said upper outside link, and said lift assembly further comprises an assembly of lower links, including a lower outside link and a lower inside link, said lower inside link rotatably connected to said lower outside link, said assembly of upper links being rotatably connected to said assembly of lower links, whereby a rotation of said assembly of upper links towards said assembly of lower links brings said carriage and said base structure closer together and a rotation of said assembly of upper links away from said assembly of lower links separates said carriage from said base structure;

means enclosing said lift assembly; and said means enclosing said lift assembly includes bellows respectively connected to said carriage and said base structure and spanning therebetween.

7. The power operated lift and presenting mechanism of claim 6 wherein said power operated lift means includes a reversible electric motor operatively connected to a screw shaft so as to pivot said screw shaft in one direction to rotate said upper links toward said lower links and in an opposite direction to rotate said upper links from said lower links.

8. A power operated lift and presenting mechanism for conveniently loading and unloading articles to and from the trunk of an automobile in which the trunk has a floor, the power operated lift and presenting mechanism comprising:

a base structure adapted to be seated on said floor of the trunk;

a carriage movable from a transport position to an elevated position and from the elevated position to the transport position, said carriage having track means disposed generally in a plane parallel to said floor of the trunk, when said base structure is seated on said floor of the trunk, and track following means engaged by said track means so as to be movable to and fro, along said track means, between a retracted position and a presenting position;

a platform connected to said track follower means so as to be movable with said track follower means between the retracted position, in which said platform is disposed generally over said base structure when said base structure is seated on said floor of the trunk, and the presenting position, in which said platform is disposed generally out from over said base structure when said base structure is seated on the floor of the trunk;

power operated lifting means for actuating said carriage upwardly from the transport position to the elevated position and downwardly from the elevated position to the transport position, said platform being in a retracted position when said carriage is so moved;

whereby, when said base structure is seated on said floor of the trunk and said carriage is in the elevated position, said platform may be moved to a presenting position in which said platform projects out from the trunk so that articles may be loaded and unloaded at elevation and disposition that is convenient for loading and unloading the articles;

said lifting means includes a lift assembly disposed between said carriage and said base structure, said lift assembly being rotatably connected respectively to said carriage and said base structure;

said carriage includes an upper guide assembly mounting said track means and wherein said base structure includes a lower guide assembly;

said lift assembly comprises an assembly of upper links including an upper outside and an upper inside link, said upper inside link rotatably connected to said upper outside link, and further comprises an assembly of lower links, including a lower outside link and a lower inside link, said lower inside link being rotatably connected to said lower outside link, said assembly of upper links being rotatably connected to said assembly of said lower links, and wherein said lift assembly is rotatably connected to said carriage by rotatable connections of said assembly of upper links to said upper guide assembly and wherein said lift assembly is rotatably connected to said base structure by rotatable connections of said assembly of lower links to said lower guide assembly, whereby a rotation of said assembly of upper links toward said assembly of lower links brings said carriage and said base structure closer together and a rotation of said assembly of upper links away from said assembly of lower links separates said carriage from said base structure;

means enclosing said lift assembly; and said means enclosing said lift assembly includes bellows respectively connected to said carriage and said base structure and spanning therebetween.

9. The power operated lift and presenting mechanism of claim 8 wherein said lift means includes power means for actuating said upper links to rotate toward and away from said lower links.

10. The power operated lift and presenting assembly of claim 9 wherein said power means includes a reversible electric motor operatively connected to a screw shaft so as to pivot said screw shaft in one direction to rotate said upper links toward the lower links and in an opposite direction to rotate said upper links from the lower links.

11. A power operated lift and presenting mechanism for conveniently loading and unloading articles to and from the trunk of an automobile in which the trunk has a floor, the power operated lift and presenting mechanism comprising:

a base structure adapted to be seated on said floor of the trunk;

a carriage movable from a transport position to an elevated position and from the elevated position to the transport position, said carriage having track means disposed generally in a plane parallel to said floor of the trunk, when said base structure is seated on said floor of the trunk, and track following means engaged by said track means so as to be movable to and fro, along said track means, between a retracted position and a presenting position;

a platform connected to side track follower means so as to be movable with said track follower means between the retracted position, in which said platform is disposed generally over said base structure when said base structure is seated on said floor of the trunk, and the presenting position, in which said platform is disposed generally out from over said base structure when said base structure is seated on the floor of the trunk;

power operated lifting means including a lift assembly disposed between said carriage and said base structure for actuating said carriage upwardly from the transport position to the elevated position and downwardly from the elevated position to the transport position, said platform being in a retracted position when the carriage is so moved;

whereby, when said base structure is seated on said floor of the trunk and said carriage is in the elevated position, said platform may be moved to a presenting position in which said platform projects out from the trunk so that articles may be loaded and unloaded at elevation and disposition that is convenient for loading and unloading the articles;

said lift assembly comprising four link members, an upper inside link, an upper outside link, a lower inside link and a lower outside link, said upper inside and outside links being pivotably connected together at an axially intermediate position on each, said lower inside and outside links being pivotably connected together at an axially intermediate position on each, said upper inside link and said lower outside link being pivotably connected together at an axial end position on each, said upper outside link and said lower inside link being pivotably connected together at an axial end position on each, said upper links being pivotably and slidably attached to said carriage and said lower links being pivotably and slidably attached to said base such that said upper links pivot towards said lower links to bring said carriage and said base together and pivot away from each other to separate said carriage from said base.

12. The power operated lift and presenting assembly of claim 11 wherein said lifting means includes a power means, said power means being mounted to said four link members intermediate said carriage and said base to cause said upper and lower links to pivot together and to pivot away from each other.

13. The power operated lift and presenting assembly of claim 11 wherein means are disposed to enclose said lift assembly, said means to enclose includes bellows respectively connected to said carriage and said base and spanning therebetween.

* * * * *